March 3, 1931.  W. H. COMPTON  1,795,197
POWER TRANSMISSION FOR LOOMS
Filed Nov. 8, 1928

Inventor
W. H. Compton.
By L. F. Randolph Jr.
Attorney

Patented Mar. 3, 1931

1,795,197

UNITED STATES PATENT OFFICE

WILLIAM H. COMPTON, OF NEWRY, SOUTH CAROLINA

POWER TRANSMISSION FOR LOOMS

Application filed November 8, 1928. Serial No. 318,068.

The invention relates to improved means for transmitting power to looms, and particularly of the Draper type, and has for its principal object the provision of a power transmission device in which the pulley, gear wheel, and brake wheel are mounted on a single hub that is secured to a crank shaft and secured for rotation with the hub, but so arranged that in event any one of the parts should require renewal because of breakage or any other reason, the substitution may be easily and quickly accomplished, said parts being readily separated from the hub.

A further object of the invention is the provision of a power transmission of the type referred to that is so constructed that it will last for an indefinite period, and furthermore that is reasonable in cost of manufacture and installation, and at the same time will permit substitution in event of breakage of any of the parts mounted on the hub without requiring separation of the hub from the shaft.

A further object of the invention is the provision of a power transmission of the type stated comprising a relatively long hub having an annular flange projecting therefrom intermediate of the ends of the hub, a brake wheel having a centrally flanged opening mounted on one side of said hub flange, a gear wheel having a laterally extending flange to cover the flange on the hub and the flange on the brake wheel, said gear wheel being mounted on the hub on the opposite side of the flange from the brake wheel, and a pulley also mounted on the hub on the same side as the gear wheel, the flange on the hub being secured to said brake wheel, gear wheel, and pulley by separable fastening means to enable replacement of the parts in event of breakage.

Figure 1:
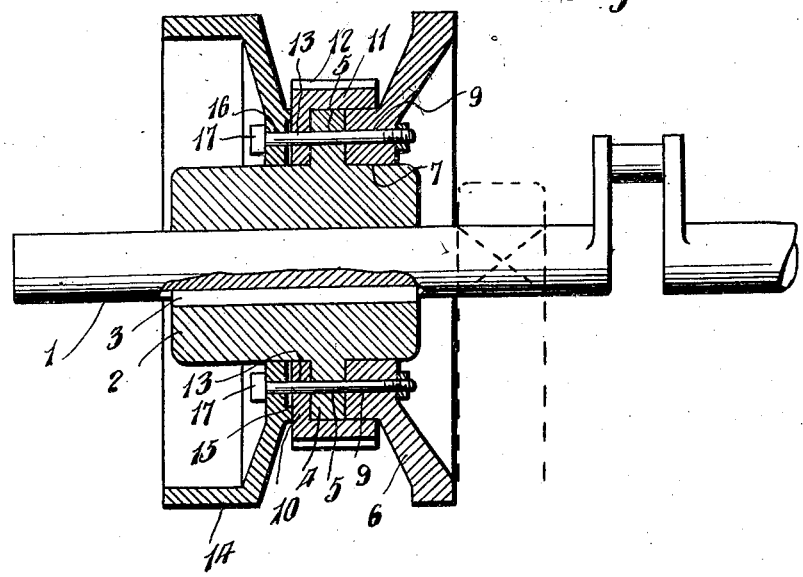
Figure 3:
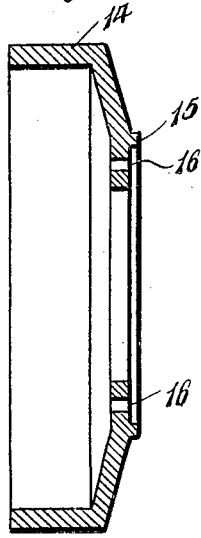
Figure 2:
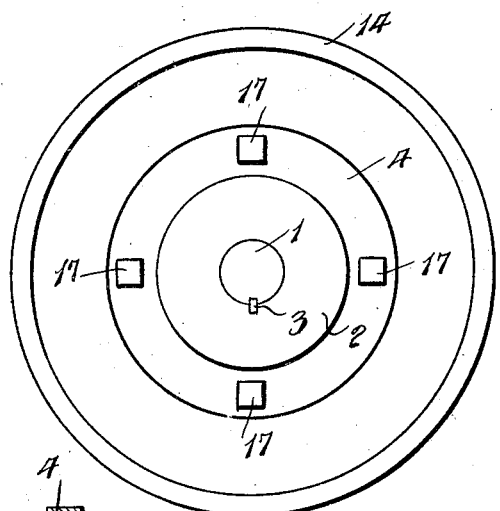
Figure 4:
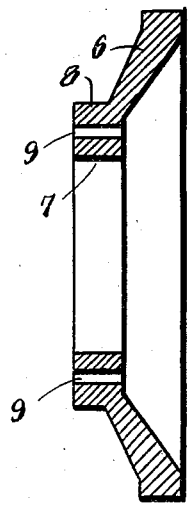
Figure 4:
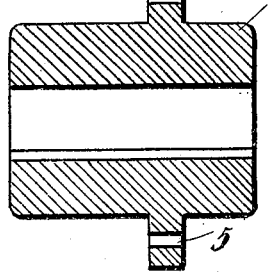

The invention will be described in detail hereinafter and will be found illustrated in the accompanying drawings in which Figure 1 is a central longitudinal sectional view of an improved transmission assembly showing it mounted on a crank shaft of a loom, the shaft being partly broken away and in section, Figure 2 is an end view, Figure 3 is a sectional detail of the pulley, Figure 4 is a sectional detail of the brake wheel, and Figure 5 a sectional detail of the hub.

In the drawings similar reference characters are used to designate corresponding parts throughout the several views.

The invention relates to transmission assembly for looms that is compact in arrangement and so constructed that in event any of the parts of the transmission should become defective substitution may be readily effected, the transmission being applied to a crank shaft 1 and comprising a hub member 2 that is secured on said crank shaft 1 by shrinking it into engagement therewith and also by keying it to the shaft as shown at 3. Hub 2 is provided with an annular flange 4 that extends circumferentially from the hub member 2 intermediate of the ends thereof, said flange 4 being provided with a plurality of openings 5. 6 indicates a brake wheel having a central flanged opening 7, the flange 8 enclosing said opening 7 being provided with a plurality of openings 9. The brake wheel 6 is mounted on the hub 2 at one side of the flange 4 as clearly shown in the drawings, Figure 1. Mounted on the other side of the flange 4, on the hub 2, is a gear wheel 10 having a laterally extending flange 11 that overlaps and encloses the flange 4 of the hub and the flange 8 of the brake wheel 6, 12 indicating gear teeth on the periphery of the gear wheel 10 and flange 11. The gear wheel 10 is provided with a plurality of openings 13 that are adapted to aline with the openings 5 in the flange 4 and the openings 9 in the flange 8. 14 indicates a pulley that is mounted on the hub 2, and is provided with a circumferential rib 15 that engages the gear wheel 10, the pulley being provided with a plurality of openings 16 that aline with the openings 13, 5 and 9 and through said alined openings are secured bolts 17 to secure the brake wheel 6, the gear wheel 10 and the pulley 14 to the flange 4 in position on the hub 2.

It will be apparent that the transmission disclosed is very compact in its arrangement and durable in construction, and at the same time is so arranged that in event replacement of either of the parts mounted on the hub should be found necessary such replacement may be effected at minimum expenditure of time. It will be furthermore understood that by the construction as shown and heretofore described the flange 11 on which is the gear face 12 is supported by the flanges 4 and 8 on the hub 2 and brake wheel 6 thus largely eliminating the danger of breakage when in use, and as the gear wheel 10 and pulley 14 are secured on the outer side of the flange 4 removal of said parts, the ones most likely to require renewal, may be readily effected without removing the hub 2 from the shaft. Furthermore, securing the three elements, 6, 10 and 14 to the hub flange by means of the bolts 17 insure a unitary movement of said elements.

What is claimed is:—

A power transmission for looms, comprising a hub adapted to be secured to the crank shaft of a loom, a pulley, gear wheel and brake wheel mounted on and collectively secured to said hub, the securing means consisting of a circumferential flange on the hub intermediate of its ends and bolts secured through said flange and said pulley and gear and brake wheels, the brake wheel provided with an axial flange extending in the direction of and engaging the hub flange and of the same diameter as said hub flange, and the gear wheel provided with a lateral flange on one side thereof only and enclosing the hub and brake wheel flanges.

In testimony whereof I affix my signature.

WILLIAM H. COMPTON.